United States Patent
Akinaga et al.

(10) Patent No.: US 10,435,510 B2
(45) Date of Patent: Oct. 8, 2019

(54) ALKOXYSILANE-MODIFIED POLYAMIC ACID SOLUTION, LAMINATE AND FLEXIBLE DEVICE EACH PRODUCED USING SAME, AND METHOD FOR PRODUCING LAMINATE

(71) Applicant: KANEKA CORPORATION, Osaka-shi, Osaka (JP)

(72) Inventors: Takahiro Akinaga, Otsu (JP); Yuki Takiguchi, Otsu (JP); Shinji Ozawa, Otsu (JP)

(73) Assignee: KANEKA CORPORATION, Osaka (JP)

( * ) Notice: Subject to any disclaimer, the term of this patent is extended or adjusted under 35 U.S.C. 154(b) by 385 days.

(21) Appl. No.: 14/764,639

(22) PCT Filed: Jan. 29, 2014

(86) PCT No.: PCT/JP2014/051943
§ 371 (c)(1),
(2) Date: Jul. 30, 2015

(87) PCT Pub. No.: WO2014/123045
PCT Pub. Date: Aug. 14, 2014

(65) Prior Publication Data
US 2015/0368402 A1   Dec. 24, 2015

(30) Foreign Application Priority Data
Feb. 7, 2013   (JP) ................................ 2013-022383

(51) Int. Cl.
| | | |
|---|---|---|
| *C08G 69/48* | (2006.01) | |
| *B32B 27/28* | (2006.01) | |
| *B32B 38/10* | (2006.01) | |
| *B32B 27/06* | (2006.01) | |
| *B32B 27/34* | (2006.01) | |
| *B32B 27/08* | (2006.01) | |
| *C08G 73/10* | (2006.01) | |
| *B32B 7/06* | (2019.01) | |
| *C09D 179/08* | (2006.01) | |
| *B32B 17/06* | (2006.01) | |

(52) U.S. Cl.
CPC ............... *C08G 69/48* (2013.01); *B32B 7/06* (2013.01); *B32B 17/064* (2013.01); *B32B 27/06* (2013.01); *B32B 27/08* (2013.01); *B32B 27/281* (2013.01); *B32B 27/34* (2013.01); *B32B 38/10* (2013.01); *C08G 73/1017* (2013.01); *C08G 73/1067* (2013.01); *C08G 73/1078* (2013.01); *C09D 179/08* (2013.01); *B32B 2307/308* (2013.01); *B32B 2307/558* (2013.01); *B32B 2307/702* (2013.01); *B32B 2307/748* (2013.01); *B32B 2457/20* (2013.01); *Y10T 156/10* (2015.01); *Y10T 428/31721* (2015.04)

(58) Field of Classification Search
CPC ....... C08G 69/48; B32B 27/06; B32B 27/281; B32B 38/10
See application file for complete search history.

(56) References Cited

U.S. PATENT DOCUMENTS

| | | | |
|---|---|---|---|
| 4,672,099 A * | 6/1987 | Kunimune | C08G 73/106 525/431 |
| 4,868,584 A | 9/1989 | Nikaido et al. | |
| 4,996,293 A | 2/1991 | Tsuyoshi | |
| 5,063,115 A | 11/1991 | Merriman, Jr. et al. | |
| 5,109,058 A | 4/1992 | Okinoshima et al. | |
| 5,346,979 A | 9/1994 | Okinoshima et al. | |
| 2002/0074686 A1 | 6/2002 | Yabuta et al. | |
| 2009/0068454 A1 * | 3/2009 | Murakami | B32B 15/08 428/337 |
| 2009/0197104 A1 | 8/2009 | Chen et al. | |
| 2010/0323161 A1 | 12/2010 | Chen et al. | |
| 2011/0124806 A1 * | 5/2011 | Simmons | C08G 73/1042 524/600 |
| 2013/0136934 A1 | 5/2013 | Iwai et al. | |
| 2013/0244000 A1 | 9/2013 | Chen et al. | |

(Continued)

FOREIGN PATENT DOCUMENTS

| | | |
|---|---|---|
| CN | 101824159 A | 9/2010 |
| JP | 63-302069 A | 12/1988 |

(Continued)

OTHER PUBLICATIONS

International Search Report dated Apr. 8, 2014, issued in counterpart International Application No. PCT/JP2014/051943 (4 pages).
Notification of Transmittal of Translation of the International Preliminary Report on Patentability (Form PCT/IB/338) issued in counterpart International Application No. PCT/JP2014/051943 dated Aug. 20, 2015 with Forms PCT/IB/373 and PCT/ISA/237 (7 pages).
"Effects and Usage of Silane Coupling Agent", Science & Technology Co. Ltd., 2010, pp. 132-139.
French et al., "Next Generation Displays Developed with EPLaR Which Can Be Produced in Liquid Crystal Panel Factories", Nikkei BP Ltd., 2008, vol. 1, pp. 144-151.
Office Action dated Oct. 3, 2017, issued in U.S. Appl. No. 15/502,706.
International Preliminary Report on Patentability dated Feb. 23, 2017, issued in PCT/JP2015/070250.

(Continued)

Primary Examiner — Tahseen Khan
(74) Attorney, Agent, or Firm — Westerman, Hattori, Daniels & Adrian, LLP

(57) ABSTRACT

The present invention provides (A) a polyamic acid solution which can be (i) used to form a film that does not peel off even in a case where the film has a large thickness, and (ii) stably stored at a room temperature, and (B) a laminate that can be suitably used for production of a flexible device. An alkoxysilane-modified polyamic acid solution of the present invention can be obtained by reacting (a) an alkoxysilane compound containing the amino group and (b) a polyamic acid solution, and has a molar ratio of 0.980 or more and 0.9995 or less, which molar ratio is obtained by dividing a total number of moles of an aromatic tetracarboxylic dianhydride by a total number of moles of an aromatic diamine.

11 Claims, No Drawings

(56) References Cited

U.S. PATENT DOCUMENTS

| | | | |
|---|---|---|---|
| 2014/0042662 A1 | 2/2014 | Tamada et al. | |
| 2015/0368402 A1 | 12/2015 | Akinaga et al. | |

FOREIGN PATENT DOCUMENTS

| | | |
|---|---|---|
| JP | S64-121 A | 1/1989 |
| JP | S64-69667 A | 3/1989 |
| JP | H02-14242 A | 1/1990 |
| JP | H03-243625 A | 10/1991 |
| JP | 7-94834 A | 4/1995 |
| JP | 2551214 B2 | 8/1996 |
| JP | 2004-256418 A | 9/2004 |
| JP | 2006-7632 A | 1/2006 |
| JP | 2007-203489 A | 8/2007 |
| JP | 2008-094927 A | 4/2008 |
| JP | 2009-294536 A | 12/2009 |
| JP | 2011-514266 A | 5/2011 |
| JP | 2012-35583 A | 2/2012 |
| JP | 2012-102155 A | 5/2012 |
| JP | 2013-10340 A | 1/2013 |
| KR | 10-2005-0072182 A | 7/2005 |
| TW | 222288 B | 4/1994 |
| WO | 2011/145696 A1 | 11/2011 |
| WO | 2013-008822 A1 | 1/2013 |
| WO | 2013/008906 A1 | 1/2013 |
| WO | 2013/125193 A1 | 8/2013 |
| WO | 2013/125194 A1 | 8/2013 |
| WO | 2014/123045 A1 | 8/2014 |

OTHER PUBLICATIONS

International Search Report dated Sep. 8, 2015, issued in PCT/JP2015/070250.
Non Final Office Action dated Feb. 9, 2018, issued in co-pending U.S. Appl. No. 15/502,706.
Office Action dated Dec. 25, 2017, issued in Japanese Patent Application No. 2014-560735, with machine translation.
Final Office Action dated Jul. 26, 2018, issued in U.S. Appl. No. 15/502,706 (15 pages).
Notice of Allowance issued in counterpart Japanese Application 2018-175090 dated Jul. 30, 2019, with English machine translation (5 pages).

* cited by examiner

ALKOXYSILANE-MODIFIED POLYAMIC ACID SOLUTION, LAMINATE AND FLEXIBLE DEVICE EACH PRODUCED USING SAME, AND METHOD FOR PRODUCING LAMINATE

TECHNICAL FIELD

The present invention relates to an alkoxysilane-modified polyamic acid solution, a laminate and a flexible device each produced with use of the alkoxysilane-modified polyamic acid solution, and a method for producing the laminate.

BACKGROUND ART

Currently, glass substrates are mainly used as a substrate in the field of electronic devices such as flat panel displays and electronic papers. However, glass substrates are disadvantageously heavy and brittle. Therefore, glass substrates are not always an ideal substrate. On this account, studies have been actively made so as to provide a flexible device in which a substrate made of glass is replaced by a substrate made of a polymer material. However, many of techniques for providing such a flexible device require new production techniques and apparatuses. Accordingly, a flexible device in which a polymer material is used has not yet been mass-produced.

Meanwhile, recently, there has been a proposal to produce, by use of an ordinary process for a case where glass substrates are used, a flexible device with use of a laminate in which a polyimide resin layer is formed on a glass substrate (Non-Patent Literature 1). This method is proposed as a shortcut for efficiently mass-producing flexible devices. In a process in which such a laminate is used, the flexible device is obtained by separating the polyimide resin layer from the glass substrate in a final step.

In the process, the laminate is required to have smoothness and low warpage for favorable handling. In other words, the polyimide resin layer of the laminate is required to have a linear expansion coefficient that is substantially the same level as that of glass. Note that soda-lime glass and alkali-free glass are generally used for glass substrates and soda-lime glass has a linear expansion coefficient of approximately 8 ppm/° C. to 9 ppm/° C. while alkali-free glass has a linear expansion coefficient of approximately 3 ppm/° C. to 5 ppm/° C. Further, a processing temperature in production of an amorphous silicon thin film transistor reaches at maximum 300° C. to 350° C. A material suitable for such a process is inevitably limited because a linear expansion coefficient of a general polyimide is greater than that of glass. For example, Patent Literature 1 discloses a method in which a laminate is obtained by (i) flow-casting, on an inorganic substrate, a solution of a polyimide precursor obtained from (a) 3,3',4,4'-biphenyltetracarboxylic dianhydride and (b) paraphenylenediamine or 4,4" diaminoparaterphenyl and (ii) subjecting the solution to thermal imidization. Meanwhile, in a case where a polyimide precursor having a specific structure is formed into a film on an inorganic substrate and then subjected to thermal imidization which is carried out by increasing a temperature at a certain rate or higher, a resultant polyimide film may peel off from the inorganic substrate. On this account, the inorganic substrate is surface-treated (Non-Patent Literature 2) or a silane coupling agent having an amino group and/or an acid anhydride group is added to a polyimide precursor solution (Patent Literatures 2 and 3), for the purpose of improving adhesion between polyimide and the inorganic substrate.

CITATION LIST

Patent Literatures

Patent Literature 1
Japanese Patent Application Publication, Tokukai, No. 2012-35583 (Publication date: Feb. 23, 2012)
Patent Literature 2
Japanese Patent Application Publication, Tokukaishou, No. 63-302069 (1988) (Publication date: Dec. 8, 1988)
Patent Literature 3
Japanese Patent Publication No. 2551214 (Registration date: Aug. 22, 1996)

Non-Patent Literatures

Non-Patent Literature 1
NIKKEI FPD 2008, vol. 1, Trends and Strategies, pp. 144-151, Nikkei BP Ltd. (2008)
Non-Patent Literature 2
Effects and Usage of Silane Coupling Agent [New Bound Edition], pp. 132-139, Science & Technology Co. Ltd. (2010)

SUMMARY OF INVENTION

Technical Problem

A polyimide precursor as disclosed in Patent Literature 1 has a low linear expansion coefficient and a specific structure. When this polyimide precursor is formed into a polyimide film on an inorganic substrate, there has been a problem in that the polyimide film peels off from an inorganic substrate if the polyimide precursor is subjected to thermal imidization which is carried out by increasing a temperature at a certain rate or higher. In general, when a film to be subjected to an imidization is thicker, a resultant film is more likely to peel off from the inorganic substrate. Therefore, it is difficult to improve productivity for a case where a laminate of a thick polyimide film and glass is produced. Further, in a case where a polyamic acid is used as the polyimide precursor, a large change in viscosity occurs in storage of the polyamic acid at a normal temperature. Therefore, it has been necessary to store the polyamic acid in a refrigerator.

In order to solve a problem of the above peel-off of the polyimide film from a substrate among the above problems, it has been proposed, for the purpose of improving adhesion between the polyimide film and the inorganic substrate, to surface-treat the inorganic substrate or to add a silane coupling agent having an amino group and/or an acid anhydride group into a polyimide precursor solution. However, in the case of a method in which the inorganic substrate is surface-treated as disclosed in Non-Patent Literature 2, there is a problem in that deterioration in productivity occurs due to increase in the number of steps. Further, in many cases of the method in which a silane coupling agent is added into a polyimide precursor solution as disclosed in Patent Literatures 2 and 3, there is a problem in that storage stability of the polyimide precursor solution is impaired.

The present invention is attained in view of the above background. An object of the present invention is to provide (A) a polyamic acid solution which can be (i) used to form a film that does not peel off even in a case where the film has a large thickness, and (ii) stably stored at a room temperature, and (B) a laminate of a polyimide film and an inorganic substrate which laminate can be suitably used for production of a flexible device, and more specifically, a laminate including a polyimide film having a linear expansion coefficient of 1 ppm/° C. to 10 ppm/° C. and an inorganic substrate.

Solution to Problem

The features of the present invention are described below. That is, an alkoxysilane-modified polyamic acid solution according to the present invention is an alkoxysilane-modified polyamic acid solution obtained by reacting, in a solution, (a) an alkoxysilane compound containing an amino group and (b) a polyamic acid having been obtained by reacting, in a solvent, an aromatic diamine and an aromatic tetracarboxylic dianhydride, the alkoxysilane-modified polyamic acid solution having a molar ratio of 0.980 or more and less than 0.9995, the molar ratio being obtained by dividing a total number of moles of the aromatic tetracarboxylic dianhydride by a total number of moles of the aromatic diamine.

Further, a method according to the present invention is a method of producing an alkoxysilane-modified polyamic acid solution, the method including the steps of: obtaining a polyamic acid by reacting, in a solvent, the aromatic diamine and the aromatic tetracarboxylic dianhydride; and obtaining the alkoxysilane-modified polyamic acid solution by reacting, in a solution, (a) an alkoxysilane compound containing an amino group and (b) the polyamic acid, the alkoxysilane-modified polyamic acid solution having a molar ratio of 0.980 or more and 0.9995 or less, the molar ratio being obtained by dividing a total number of moles of an aromatic tetracarboxylic dianhydride by a total number of moles of an aromatic diamine.

Advantageous Effects of Invention

The present invention makes use of an alkoxysilane-modified polyamic acid solution in which some terminals of a polyamic acid is modified with alkoxysilane. This makes it possible to prevent peel-off (delamination, foaming) of a polyimide film from an inorganic substrate at the time when the polyimide film is produced by applying the alkoxysilane-modified polyamic acid solution onto an inorganic substrate and heating the alkoxysilane-modified polyamic acid solution.

Further, in the alkoxysilane-modified polyamic acid solution in which most of terminals of polyamic acid are adjusted so as to be an amino group, an amide bond tends to be produced when degradation occurs. Accordingly, a molecular weight of the alkoxysilane-modified polyamic acid solution hardly changes. This makes it possible to suppress a change in viscosity in varnish storage.

DESCRIPTION OF EMBODIMENTS

The following discusses the present invention in detail. However, the following is only one aspect of the present invention and the present invention is not limited to the following description. Note that the wording "A to B" indicative of a numerical range means "A or more and B or less" unless specifically mentioned otherwise.

<Alkoxysilane-Modified Polyamic Acid Solution>

An alkoxysilane-modified polyamic acid solution (hereinafter, also referred to simply as "solution") is obtained by reacting, in a solution, (a) an alkoxysilane compound containing an amino group and (b) a polyamic acid. Further, the polyamic acid is obtained by reacting, in a solvent, an aromatic diamine and an aromatic tetracarboxylic dianhydride.

In the present invention, it is necessary that the amino group occupy polyamic acid terminals at a higher ratio as compared to a carboxyl group, for the purpose of improving storage stability. Raw materials and a polymerization method of the polyamic acid will be discussed later.

Modification with the alkoxysilane compound containing the amino group is carried out by adding (a) the alkoxysilane compound containing the amino group to (b) a polyamic acid solution obtained by dissolving the polyamic acid into a solvent, and reacting (a) the alkoxysilane compound and (b) the polyamic acid solution. Examples of the alkoxysilane compound containing the amino group encompass: 3-aminopropyl trimethoxysilane, 3-aminopropyl triethoxysilane, 3-aminopropyl methyl dimethoxysilane, 3-aminopropyl methyl diethoxysilane, 3-(2-aminoethyl)aminopropyl trimethoxysilane, 3-phenylaminopropyl trimethoxysilane, 2-aminophenyl trimethoxysilane, 3-aminophenyl trimethoxysilane and the like.

A mixing ratio of the alkoxysilane compound containing the amino group is preferably 0.01 part by weight to 0.50 part by weight, more preferably 0.01 part by weight to 0.05 part by weight, and in view of suppressing a change in viscosity in varnish storage, still more preferably 0.01 part by weight to 0.03 part by weight, with respect to 100 parts by weight of the polyamic acid.

In a case where the mixing ratio of the alkoxysilane compound containing the amino group is arranged to be 0.01 part by weight or more, it is possible to exert a sufficient preventing effect against peeling of a resultant film from the inorganic substrate. In a case where the mixing ratio of the alkoxysilane compound containing the amino group is 0.50 part by weight or less, a problem of embrittlement or the like of a resultant film does not occur because a sufficient molecular weight of the polyamic acid is maintained. Further, in a case where the mixing ratio is 0.05 part by weight or less, a change in viscosity after addition of the alkoxysilane compound becomes small. Meanwhile, in a case where an amount of unreacted components is large, (a) a viscosity of the alkoxysilane-modified polyamic acid solution decreases because a reaction with the polyamic acid gradually proceeds and/or (b) gelatification of the alkoxysilane-modified polyamic acid solution occurs because alkoxysilanes condense with each other. By suppressing an addition amount of the alkoxysilane compound containing the amino group to a minimal amount, it is possible to prevent unwanted side reactions such as (a) decrease in viscosity and (b) gelatification in varnish storage while preventing peeling of a polyimide film from a substrate.

When the alkoxysilane compound containing the amino group is added to a polyamic acid whose terminals are mostly amino groups, a viscosity of the polyamic acid solution decreases. The inventors of the present invention infer that such decrease in viscosity occurs for the following reason. That is, as denaturalization reaction proceeds due to reaction between (a) an acid anhydride group that is reproduced at the time when an amide bond in the polyamic acid dissociates and (b) an amino group of the alkoxysilane compound, a molecular weight of the polyamic acid decreases. A reaction temperature is preferably 0° C. or higher and 80° C. or lower, and more preferably 20° C. or higher and 60° C. or lower. This is because at such a reaction temperature, the denaturalization reaction easily proceeds while reaction between the acid anhydride group and water is suppressed.

There is a case where approximately 5 days are required before a viscosity is stabilized. Though it depends on a kind and a concentration of the polyamic acid, such a case occurs if (a) the denaturalization reaction is slow due to a low concentration of the acid dianhydride and (b) a reaction temperature is low. In a case where a different kind of the polyamic acid and/or a different solvent is employed, a change in viscosity should be recorded for each reaction temperature and for each time and an appropriate reaction temperature should be selected.

By the above-described denaturalization of some terminals with alkoxysilane, it is possible to prevent peel-off (delamination, foaming) of a polyimide film in heating in a case where the polyamic acid solution is applied onto an inorganic substrate. Further, by having an arrangement in which most terminals of the polyamic acid is adjusted to be an amino group, an amide bond is easily formed even in a case where degradation of the alkoxysilane-modified polyamic acid solution occurs. As a result, the molecular weight hardly changes and consequently, a change in viscosity in varnish storage can be suppressed.

<Raw Materials of Polyamic Acid>

As described above, as the raw materials of the polyamic acid, an aromatic tetracarboxylic dianhydride and an aromatic diamine are employed.

For the purpose of obtaining a laminate of an inorganic substrate and a polyimide film whose linear expansion coefficient is 1 ppm/° C. to 10 ppm/° C., it is preferable to principally employ, as the aromatic tetracarboxylic dianhydride, 3,3',4,4'-biphenyltetracarboxylic dianhydride (hereinafter, also abbreviated as BPDA) while it is preferably to principally employ, as the aromatic diamine, an aromatic diamine represented by the following formula (1):

[Chem. 1]

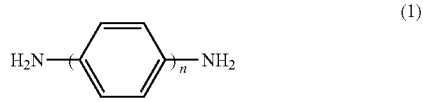

(1)

(where n is an integer of 1 to 3)

The aromatic diamine represented by the above formula (1) encompasses: paraphenylene diamine (hereinafter, also abbreviated as PDA), 4,4'-diamino benzidine and 4,4''-diamino paraterphenyl (hereinafter, also abbreviated as DATP). Among these aromatic diamines, PDA and DATP are preferable in view of availability.

The aromatic tetracarboxylic dianhydride is preferably 3,3',4,4'-biphenyltetracarboxylic dianhydride. By using an alkoxysilane-modified polyamic acid solution including (a) 3,3',4,4'-biphenyltetracarboxylic dianhydride and (b) as the aromatic diamine, an aromatic diamine, such as paraphenylenediamine, which has a high linearity, it is possible to give a suitable property such as a low CTE to a flexible device substrate.

Further, as long as properties of the present invention are not spoiled, an aromatic diamine other than PDA, 4,4'-diamino benzidine, and DATP can be used while an aromatic tetracarboxylic dianhydride other than 3,3',4,4'-biphenyltetracarboxylic dianhydride can be used. For example, 5 mol % or less of any of the following aromatic tetracarboxylic dianhydrides and 5 mol % or less of any of the following aromatic diamines can be used in combination with respect to all the raw materials of the polyamic acid.

Examples of the aromatic tetracarboxylic dianhydride encompass: pyromellitic dianhydride, 3,3',4,4'-benzophenone tetracarboxylic dianhydride, 2,3,3',4'-biphenyltetracarboxylic dianhydride, 3,3',4,4'-diphenylsulfone tetracarboxylic dianhydride, 1,4,5,8-naphthalene tetracarboxylic dianhydride, 2,3,6,7-naphthalene tetracarboxylic dianhydride, 1,2,5,6-naphthalene tetracarboxylic dianhydride, 4,4'-oxydiphthalic anhydride, 9,9-bis(3,4-dicarboxyphenyl)fluorene dianhydride, 9,9'-bis[4-(3,4-dicarboxyphenoxyl)phenyl]fluorene dianhydride, 3,3',4,4'-biphenylether tetracarboxylic dianhydride, 2,3,5,6-pyridine tetracarboxylic dianhydride, 3,4,9,10-perylene tetracarboxylic dianhydride, 4,4'-sulfonyl diphthalic dianhydride, paraterphenyl-3,4,3',4'-tetracarboxylic dianhydride, metaterphenyl-3,3',4,4'-tetracarboxylic dianhydride, 3,3',4,4'-diphenylether tetracarboxylic dianhydride, and the like. The above acid dianhydrides can have an aromatic ring having an alkyl-substituted portion and/or a halogen-substituted portion.

Examples of the aromatic diamine encompass: 4,4'-diamino diphenyl ether, 3,4'-diamino diphenylether, 4,4'-diamino diphenylsulfone, 1,5-(4-aminophenoxyl)pentane, 1,3-bis(4-aminophenoxy)-2,2-dimethylpropane, 2,2-bis(4-aminophenoxyphenyl)propane, bis[4-(4-aminophenoxyl)phenyl]sulfone and bis[4-(3-aminophenoxyl)phenyl]sulfone, and the like.

<Polymerization Method of Polyamic Acid>

The polyamic acid employed in the present invention can be produced by solution polymerization. That is, the polyamic acid solution that is a polyamide precursor is obtained by polymerization in an organic polar solvent. In the polymerization, one or more kinds of aromatic tetracarboxylic dianhydride and one or more kinds of aromatic diamine are used as row materials in a manner such that a molar ratio of the aromatic diamine is higher than that of a carboxyl group.

A molar ratio is obtained by dividing a total number of moles of the aromatic tetracarboxylic dianhydride by a total number of moles of the aromatic diamine. This molar ratio is preferably 0.980 or more and 0.9995 or less, and more preferably 0.995 or more and 0.998 or less. By setting the molar ratio to 0.9995 or less, a ratio of polyamic acid terminals occupied by an amino group becomes higher than that by an acid anhydride group. This makes it possible to improve storage stability. Though this effect is further improved by decreasing the molar ratio, the molar ratio of 0.998 or less does not improve the storage stability largely. Meanwhile, in a case where a strong polyimide film is to be obtained, it is necessary to sufficiently increase a molecular weight by setting the molar ratio to a value closer to 1.000. The molar ratio of 0.980 or more makes it possible to obtain a strong polyimide film that is excellent in tensile strength. Further, preferably, the molar ratio should be set to 0.998 or more so as to prepare against decrease in molecular weight in storage and imidization. Note here that the tensile strength is evaluated by a test method for determining tensile properties as described in JIS K7127:1999.

Preferred examples of a solvent for synthesis of the polyamic acid are amide solvents such as N,N-dimethylformamide, N,N-dimethylacetamide, and N-methyl-2-pyrolidone. It is possible to control properties of the polyamic acid solution, and also properties of the polyimide film after imidization of the polyamic acid solution on an inorganic substrate, by appropriately selecting a solvent from among the above solvents. The solvent is preferably a solvent whose main component is an amide solvent. On the premise that a weight of a whole solvent is 100 parts by weight, a weight of the amide solvent is preferably 50 parts by weight to 100 parts by weight, and more preferably 70 parts by weight to 100 parts by weight.

In studies made by the inventors of the present invention, in a case where N,N-dimethylacetamide is employed as the solvent, storage stability of the polyamic acid deteriorates while the linear expansion coefficient of the polyimide film becomes higher. Meanwhile, in a case where N-methyl-2-pyrolidone is employed as the solvent, the storage stability of the polyamic acid solution is high while the linear expansion coefficient of the polyimide film becomes lower. As to the storage stability, a better property is obtained in a case where N-methyl-2-pyrolidone is used. However, in view of properties such as the linear expansion coefficient, neither of a case where N,N-dimethylacetamide is used and a case where N-methyl-2-pyrolidone is used is superior to the other. A suitable solvent should be selected depending on an intended application. For example, if a harder polyimide film is preferred, N-methyl-2-pyrolidone should be used. Meanwhile, if a softer polyimide film is preferred, N,N-dimethylacetamide should be used.

Preferably, a reaction apparatus is provided with a temperature control device for controlling a reaction temperature. At the time when the polyamic acid is polymerized, the reaction temperature is preferably 0° C. or higher and 80° C. or lower, and more preferably 20° C. or higher and 60° C. or lower. Such a reaction temperature is preferable because dissociation (which is a reverse reaction of polymerization) of an amide bond is prevented and a viscosity of the polyamic acid tends to increase at the reaction temperature.

Further, it is possible to carry out a heat treatment at a temperature of approximately 70° C. to 90° C. for 1 hour to 24 hours after the polymerization. This heat treatment is intended to adjust the viscosity and the molecular weight. The heat treatment is an operation conventionally called "cooking". The heat treatment is carried out so as to (i) promote dissociation of an amino acid and deactivation of an acid dianhydride by reaction with water in a system, and (ii) set the viscosity of the polyamic acid solution to a level suitable for a subsequent operation. It is preferable to separately carry out the polymerization reaction and the cooking because it becomes easy to deactivate an unreacted aromatic tetracarboxylic dianhydride. However, the polymerization and the cooking can be carried out together by setting a reaction temperature in a range of 70° C. to 90° C. from the beginning.

As to an amount in weight % of the polyamic acid in the polyamic acid solution, an amount of the polyamic acid dissolved in an organic solvent is 5 weight % to 30 weight %, preferably 8 weight % to 25 weight %, and more preferably 10 weight % to 20 weight %. This is because at the amount, gelatification caused by abnormal polymerization of undissolved raw materials can be prevented and furthermore, the viscosity of the polyamic acid tends to increase.

<Water Content in Alkoxysilane-Modified Polyamic Acid Solution>

A water content in any of all the above-described alkoxysilane-modified polyamic acid solutions is preferably 500 ppm or more and 3000 ppm or less, and more preferably 500 ppm or more and 1000 ppm or less. The water content is preferably 3000 ppm or less because such a water content allows sufficient exertion of a storage stability improving effect brought about by adjustment of the molar ratio. The content of 1000 ppm or less is more preferable because the content of 1000 ppm or less makes it possible to (i) reduce a probability of deactivation caused by reaction between water and an acid anhydride group that has been produced by dissociation of an amide bond in a polyamic acid molecule, and (ii) thereby suppress a change in viscosity in varnish storage. The water in the alkoxysilane-modified polyamic acid can be classified into water derived from the raw materials and water resulting from a work environment. Although there are various methods for reducing such water, it is not preferable to reduce the water more than necessary in an additional step or by use of excessive equipment because an increase in cost occurs. It is not preferable, for example, to reduce the water content to 500 ppm or less because a commercially available amide solvent has a water content of approximately 500 ppm and reduction of the water content of the alkoxysilane-modified polyamic acid solution to 500 ppm or less causes an increase in cost.

As a method of reducing the water content, it is effective (i) to store raw materials under strict management so that water is prevented from mixing in the raw materials and (ii) to replace a reaction atmosphere by dry air, dry nitrogen, or the like. Additionally, a treatment under reduced pressure can also be carried out.

<Relation Between (a) Molar Ratio Obtained by Dividing Total Number of Moles of Aromatic Tetracarboxylic Dianhydride by Total Number of Moles of Aromatic Diamine and (b) Water Content in Alkoxysilane-Modified Polyamic Acid Solution>

A preferable value of the molar ratio obtained by dividing the total number of moles of the aromatic tetracarboxylic dianhydride by the total number of moles of the aromatic diamine may vary in relation to the water content in the alkoxysilane-modified polyamic acid solution.

For example, in view of obtaining a polyamic acid solution which is superior in storage stability to another polyamic acid solution which has a substantially equal water content and the molar ratio of 1.000 or more, (i) preferably, the molar ratio is 0.9975 or less and the water content is 2500 or less and (ii) more preferably, the molar ratio is 0.9975 or less and the water content is 2200 or less. Further, in view of the above, the molar ratio is still more preferably 0.9950 or less and particularly preferably 0.9901 or less.

<Flow Casting and Thermal Imidization of Alkoxysilane-Modified Polyamic Acid Solution>

A laminate including a polyimide film and an inorganic substrate can be produced by flow-casting the above-described alkoxysilane-modified polyamic acid solution onto the inorganic substrate and carrying out thermal imidization. The laminate can also be said to be a laminate in which a polyimide film obtained from the alkoxysilane-modified polyamic acid solution is laminated on an inorganic substrate.

The inorganic substrate can be any of glass substrates and various metal substrates, and is preferably a glass substrate. For the glass substrate, soda-lime glass, borosilicate glass, alkali-free glass or the like is used. Particularly, an alkali-free glass substrate is more preferable as the inorganic substrate, because alkali-free glass is in general used in a production process of a thin film transistor. The inorganic substrate employed has a thickness of preferably 0.4 mm to 5.0 mm. The thickness of the inorganic substrate is preferably 0.4 mm or more, because the inorganic substrate having the thickness of 0.4 mm or more can be easily handled. Meanwhile, the thickness of the inorganic substrate is preferably 5.0 mm or less, because the inorganic substrate having the thickness of 5.0 mm or less has a smaller thermal capacity and therefore productivity in a heating or cooling process is improved.

As the flow-casting method for the solution can be any publicly known method. Examples of such a publicly known flow-casting method encompass gravure coating, spin coating, silk screening, dip coating, bar coating, knife coating, roll coating, die coating and the like.

The alkoxysilane-modified polyamic acid solution can be the above-described reaction solution as it is, or a solution obtained by removing or adding a solvent as necessary to/from the above-described reaction solution. Examples of the solvent that can be employed for the polyimide precursor solution (i.e., the alkoxysilane-modified polyamic acid solution) encompass: dimethylsulfoxide, hexamethylphosphoramide, acetonitrile, acetone, and tetrahydrofuran in addition to N,N-dimethylformamide, N,N-dimethylacetamide, and N-methyl-2-pyrolidone. Further, as an auxiliary agent, xylene, toluene, benzene, diethylene glycol ethyl ether, diethylene glycol dimethyl ether, 1,2-bis-(2-methoxyethoxyl)ethane, bis(2-methoxyethyl)ether, butylcellosolve, butylcellosolve acetate, propyleneglycol methyl ether and propyleneglycol methyl ether acetate can be used in combination.

In the polyimide precursor solution, an imidization catalyst, inorganic fine particles, and the like can be added as necessary.

The imidization catalyst is preferably a tertiary amine. Further, the tertiary amine is preferably a heterocyclic tertiary amine. Preferred specific examples of the heterocyclic tertiary amine encompass: pyridine, 2,5-diethylpyridine, picoline, quinoline, isquinoline, and the like. An amount of the imidization catalyst used is preferably 0.01 equivalent to 2.00 equivalent and particularly preferably 0.02 equivalent to 1.20 equivalent, with respect to a reacted portion of the polyimide precursor (i.e., alkoxysilane-modified polyamic acid). The amount of the imidization catalyst is preferably 0.01 equivalent or more, because such an amount allows sufficiently obtaining an effect of the imidization catalyst. Meanwhile, the amount of the imidization catalyst is preferably 2.00 equivalents or less in view of cost, because a ratio of the imidization catalyst which is not involved in the reaction is low.

Examples of the organic particles encompass: inorganic oxide powder such as particulate silicon dioxide (silica) powder and particulate aluminum oxide powder; and organic salt powder such as particulate calcium carbonate powder and particulate calcium phosphate powder. In the field of the present invention, a coarse particle among such organic fine particles may cause a defect in subsequent steps. Therefore, the organic fine particles are preferably dispersed uniformly.

The thermal imidization is a method in which an imidization reaction proceeds only by heating without any action of a cyclodehydrating agent or the like. For the thermal imidization, a heating temperature and a heating time can be set as appropriate and, for example, can be set as follows. First, heating is carried out at a temperature of 100° C. to 200° C. for 3 minutes to 120 minutes so as to vaporize the solvent. This heating can be carried out in an atmosphere of the air, under reduced pressure, or in an inactive gas such as nitrogen. Further, for the heating, it is possible to employ, as a heating device, a publicly known device such as a hot-air oven, an infrared oven, a vacuum oven, or a hot plate. Next, heating is further carried out at a temperature of 200° C. to 500° C. for 3 minutes to 300 minutes so as to cause imidization to proceed. As a heating condition at this time, preferably, the temperature is gradually increased from a low temperature to a high temperature. Further, the maximum temperature is preferably in a range of 300° C. to 500° C.

The maximum temperature is preferably 300° C. or higher, because the maximum temperature of 300° C. or higher allows the thermal imidization to easily proceed and also improves a mechanical property of a resultant polyimide film. Meanwhile, the maximum temperature is preferably 500° C. or lower because the maximum temperature of 500° C. or lower prevents thermal degradation of polyimide from proceeding and consequently prevents properties from deteriorating.

In a case where a conventional polyamic acid solution is employed, the polyimide film tends to peel off spontaneously from an inorganic substrate in heating, depending on a kind and a thickness of the polyamic acid, a kind and a surface state of the inorganic substrate, heating conditions, and a heating method. However, with use of the alkoxysilane-modified polyamic acid solution, spontaneous peeling can be prevented and a process window can be significantly broadened.

Preferably, the polyimide film has a thickness of 5 μm to 50 μm. When the polyimide film has the thickness of 5 μm or more, it is possible to ensure a mechanical strength which a substrate film is required to have. Meanwhile, when the polyimide film has the thickness of 50 μm or less, it is possible to obtain the laminate of the polyimide film and the inorganic substrate only by adjustment of the heating conditions while causing no spontaneous peeling in the laminate.

The polyimide film preferably has the thickness of 5 μm or more, because the thickness of 5 μm or more makes it possible to sufficiently ensure a mechanical strength which a substrate film is required to have. Meanwhile, the polyimide film preferably has the thickness of 50 μm or less, because the thickness of 50 μm or less makes it easy to stably obtain the laminate by the above-described spontaneous peeling. The laminate obtained by the present invention is excellent in storage stability and process consistency. Therefore, the laminate can be suitably used in production of a flexible device by use of a publicly known thin film transistor processing for liquid crystal panels.

In a way described above, it possible to obtain a laminate made of (a) a polyimide film having a linear expansion coefficient of 1 ppm/° C. to 10 ppm/° C. and an inorganic substrate, by: (i) flow-casting a solution of the polyimide precursor on the inorganic substrate and then carrying out thermal imidization; and (ii) selecting a specific structure for a skeleton of the polyamic acid. Then, use of thus obtained laminate makes it possible to obtain a flexible device having an excellent property.

<Formation of Electronic Element, and Peeling>

Use of the laminate according to the present invention makes it possible to obtain a flexible device having an excellent property. In other words, it is possible to obtain a flexible device by first forming an electronic element on the polyimide film of the laminate according to the present invention and then peeling the polyimide film from the inorganic substrate. Further, the above process for obtaining the flexible device can advantageously employ an existing apparatus for production in which an inorganic substrate is used, without any change to the existing apparatus. Accordingly, the laminate according to the present invention can be effectively used in the field of electronic devices such as flat panel displays and electronic papers, and are also suitable for mass-production of flexible devices.

A publicly known method can be employed as a method for peeling the polyimide film from the inorganic substrate. For example, the polyimide film can be peeled off from the inorganic substrate manually or by use of mechanical equipment such as a driving roller or a robot. Further, the method alternatively can be a method in which a release layer is provided between the inorganic substrate and the polyimide film. In addition, for example, the method can alternatively be (a) a method in which the polyimide film is peeled off by (i) forming a silicon oxide film on the inorganic substrate having a lot of grooves and (ii) causing infiltration of etching liquid, (b) a method in which the polyimide film is separated with laser beams, by providing an amorphous silicon layer on the inorganic substrate, or the like.

The flexible device of the present invention includes a polyimide film that has an excellent heat resistance and a low linear expansion coefficient. Accordingly, the flexible device has excellent properties such as not only light weight and impact resistance but also improved warpage. Particularly as to the warpage, it is possible to obtain a flexible device whose warpage is improved, by employing a method in which a polyimide film is directly flow-casted and laminated on an inorganic substrate, which polyimide film has a low linear expansion coefficient that is as low as a linear expansion coefficient of the inorganic substrate.

The present invention also can be arranged as follows.

An alkoxysilane-modified polyamic acid solution according to the present invention is obtained by reacting, in a solution, (a) an alkoxysilane compound containing an amino group and (b) a polyamic acid having been obtained by reacting, in a solvent, an aromatic diamine and an aromatic tetracarboxylic dianhydride, the alkoxysilane-modified polyamic acid solution having a molar ratio of 0.980 or more and 0.9995 or less, the molar ratio being obtained by dividing a total number of moles of the aromatic tetracarboxylic dianhydride by a total number of moles of the aromatic diamine.

The alkoxysilane-modified polyamic acid solution according to the present invention may be arranged to have a water content of 500 ppm or more and 3000 ppm or less.

The alkoxysilane-modified polyamic acid solution according to the present invention may be arranged such that: the aromatic tetracarboxylic dianhydride is 3,3',4,4'-biphenyltetracarboxylic dianhydride; and the aromatic diamine is represented by the following formula (1):

[Chem. 2]

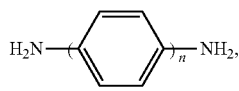

(1)

where n is an integer of 1 to 3.

The alkoxysilane-modified polyamic acid solution according to the present invention may be arranged such that a main component of the solvent is an amide solvent.

The alkoxysilane-modified polyamic acid solution according to the present invention may be arranged such that: in a case where an amount of the polyamic acid in the alkoxysilane-modified polyamic acid solution is 100 parts by weight, an amount of the alkoxysilane compound added is 0.01 part by weight to 0.50 part by weight.

A method according to the present invention of producing a laminate, the method includes the steps of:

flow-casting the alkoxysilane-modified polyamic acid solution according to the present invention on an inorganic substrate; and obtaining, by thermal imidization of the alkoxysilane-modified polyamic acid solution, the laminate in which a polyimide film obtained from the alkoxysilane-modified polyamic acid solution is laminated on the inorganic substrate.

A method according to the present invention of producing a flexible device, the method includes the steps of: forming an electronic element on a polyimide film of a laminate obtained by the method according to the present invention of producing a laminate; and peeling, from the inorganic substrate, the polyimide film on which the electronic element has been formed.

A laminate according to the present invention includes: a polyimide film obtained from the alkoxysilane-modified polyamic acid solution according to the present invention; and an inorganic substrate on which the polyimide film is laminated, the polyimide film having a linear expansion coefficient of 1 ppm/° C. to 10 ppm/° C.

The laminate according to the present invention may be arranged such that: the inorganic substrate has a thickness of 0.4 mm to 5.0 mm; and the polyimide film has a thickness of 10 μm to 50 μm.

A flexible device according to the present invention includes: a polyimide film obtained from the alkoxysilane-modified polyamic acid solution according to the present invention; and an electronic element formed on the polyimide film.

A method according to the present invention of producing an alkoxysilane-modified polyamic acid solution, the method includes the steps of: obtaining a polyamic acid by reacting, in a solvent, the aromatic diamine and the aromatic tetracarboxylic dianhydride; and obtaining the alkoxysilane-modified polyamic acid solution by reacting, in a solution, (a) an alkoxysilane compound containing an amino group and (b) the polyamic acid, the alkoxysilane-modified polyamic acid solution having a molar ratio of 0.980 or more and 0.9995 or less, the molar ratio being obtained by dividing a total number of moles of an aromatic tetracarboxylic dianhydride by a total number of moles of an aromatic diamine.

EXAMPLES

The following specifically discusses the present invention by referring to Examples. However, note that the present invention is not limited to the following Examples but can encompass variously altered embodiments within the scope of the present invention.

(Property Evaluation Method)

(Water Content)

A titrator for Karl Fischer coulometric titrations 890 Titrando (manufactured by Metrohm Japan) was used to measure a water content in a solution according to JIS K0068 (coulometric titration method). However, in a case where resin deposited in a titration solvent, a mixture solution of AQUAMICRON GEX (manufactured by Mitsubishi Chemical Corporation) and N-methylpyrolidone in a proportion of 1:4 was used as a titration solvent.

(Viscosity)

By use of Viscometer RE-215/U (manufactured by Toki Sangyo Co. Ltd.), a viscosity was measured according to JIS K7117-2:1999. An accessory thermostat was set at 23.0° C. and a temperature for measurement was always kept constant.

(Linear Expansion Coefficient)

A linear expansion coefficient was evaluated by thermomechanical analysis employing a tension loading method. In this evaluation, TMA/SS120CU manufactured by SII Nano-Technology Inc. was used. Measurement was carried out by (i) peeling a polyimide film of each Example from a glass substrate that was an inorganic substrate and preparing a sample of 10 mm×3 mm, (ii) applying a load of 3.0 g to a long side of the sample, (iii) heating the sample to 500° C. or higher so that residual stress was removed, and (iv) thereafter, heating again at a temperature increase rate of 10° C./min. The linear expansion coefficient was an amount of change in distortion of the sample per unit temperature in a range of 100° C. to 300° C. in the step (iv) of heating.

Example 1

(1-1) Production of Polyamic Acid Solution

Into a 2 L glass separable flask equipped with a stirrer having a polytetrafluoroethylene sealing plug, a stirring blade, and a nitrogen inlet tube, 850.0 g of N,N-dimethylacetamide (DMAc) having been dehydrated with use of a molecular sieve was introduced. Then, 40.31 g of paraphenylenediamine (PDA) was added. Thereafter, a resultant solution was stirred for 30 minutes in a nitrogen atmosphere while being heated to 50.0° C. in an oil bath. After it was confirmed that ingredients were uniformly dissolved, 109.41 g of 3,3',4,4'-biphenyltetracarboxylic dianhydride (BPDA) was added. Then, a temperature of the solution was adjusted to approximately 80° C., while the solution was being stirred for 10 minutes in a nitrogen atmosphere until ingredients were completely dissolved. Further, stirring was continued for 3 hours while the solution was heated at a constant temperature. Thereby, a viscosity of the solution was decreased. Furthermore, 153.8 g of DMAc was added to the solution and the solution was stirred, so that a viscous polyamic acid solution exhibiting a viscosity of 25000 mPa·s at 23° C. was obtained. Note that a concentration of an aromatic diamine and an aromatic tetracarboxylic dianhydride which were added in the above reaction solution was 15 weight % with respect to a whole reaction solution. Meanwhile, a molar ratio obtained by dividing the total number of moles of the aromatic tetracarboxylic dianhydride by the total number of moles of the aromatic diamine was 0.9975.

(1-2) Denaturalization with Alkoxysilane Compound Containing Amino Group

The above polyamic acid solution was rapidly cooled in a water bath and a temperature of the solution was adjusted to approximately 50° C. Next, 7.50 g of a 1% DMAc solution of 3-aminopropyl triethoxysilane (γ-APS) was added and the solution was stirred. Reaction of the solution was ended after 5 hours because change in viscosity stopped at 23000 mPa·s. Then, the solution was diluted with DMAc until the viscosity of the solution reached a viscosity that would allow easy handling of the solution. In this way, an alkoxysilane-modified polyamic acid solution exhibiting a viscosity of 13700 mPa·s at 23° C. and having a water content of 1400 ppm was obtained. Note that a blend ratio (addition amount) of an alkoxysilane compound (γ-APS) in the above reaction was 0.050 part by weight with respect to 100 parts by weight of polyamic acid.

Thus obtained solution was stored in a glass bottle sealed with a stopper, for a week in an environment at 23° C. 55% RH. Then, a viscosity of a resultant solution was measured again, so that a resultant viscosity was found to be 12400 mPa·s (−9%).

(1-3) Flow-Casting and Thermal Imidization of Polyimide Precursor

The resultant alkoxysilane-modified polyamic acid solution was flow-casted on an alkali-free glass plate (Corning Incorporated, Eagle XG) which was generally used as a FPD glass substrate having a square shape of 150 mm in side and 0.7 mm in thickness, so as to have a dry thickness of 20 μm by use of a bar coater. Then, thus flow-casted alkoxysilane-modified polyamic acid solution was dried for 20 minutes at 80° C. in a hot air oven, and further dried for 30 minutes at 150° C. Furthermore, heating at 220° C. for 30 minutes, heating at 300° C. for 30 minutes, and additionally, heating at 430° C. for 1 hour and heating at 500° C. for 1 hour were carried out. The temperature was gradually increased at 2° C./min between two consecutive temperatures. As a result of thermal imidization at a high temperature, a laminate of the alkali-free glass and a polyimide film that had a thickness of 19 μm was obtained. The polyimide film and the alkali-free glass plate had an appropriate peel strength, so that the polyimide film did not spontaneously peel off from the alkali-free glass plate in heating but could be stripped from the glass plate. Table 1 shows properties of a resultant polyimide film.

Example 2

Except that an addition amount of a 1% DMAc solution of γ-APS was changed to 1.50 g, an alkoxysilane-modified polyamic acid solution was obtained as in Example 1. Note that the addition amount of γ-APS in this reaction was 0.010 part by weight with respect to 100 parts by weight of polyamic acid. Thus obtained solution had a viscosity of 13100 mPa·s at 23° C. and a water content of 2800 ppm. Further, as in the method in Example 1, a laminate of an alkali-free glass plate and a polyimide film that had a thickness of 20 μm could be obtained without spontaneous peeling. Table 1 and Table 2 show a change in viscosity in storage and properties of the polyimide film.

Example 3

Into an experimental apparatus that was the same as that in Example 1, 850.0 g of dehydrated DMAc was introduced. Then, 40.39 g of PDA was added. Thereafter, a resultant solution was stirred for 30 minutes in a nitrogen atmosphere while being heated to 50.0° C. in an oil bath. After it was confirmed that ingredients were uniformly dissolved, 109.34 g of BPDA was added. Then, a temperature of the solution was adjusted to approximately 80° C., while the solution was being stirred for 10 minutes in a nitrogen atmosphere until ingredients were completely dissolved. Further, stirring was continued for 5 hours while the solution was heated at a constant temperature. Thereby, a viscosity was decreased and as a result, a viscous polyamic acid solution exhibiting a viscosity of 25300 mPa·s at 23° C. was obtained. Note that a concentration of an aromatic diamine and an aromatic tetracarboxylic dianhydride which were added in the above reaction solution was 15 weight % with respect to a whole reaction solution. Meanwhile, a molar ratio obtained by dividing the total number of moles of the aromatic tetracarboxylic dianhydride by the total number of moles of the aromatic diamine was 0.9950.

Further, the above reaction solution was rapidly cooled in a water bath and a temperature of the solution was adjusted to approximately 50° C. Next, 7.50 g of a 1% DMAc solution of γ-APS was added and the solution was stirred. Reaction of the solution was ended after 5 hours because change in viscosity stopped at 19100 mPa·s. Then, the solution was diluted with DMAc until the viscosity of the solution reached a viscosity that would allow easy handling of the solution. In this way, an alkoxysilane-modified polyamic acid solution exhibiting a viscosity of 13800 mPa·s at 23° C. and having a water content of 1900 ppm was obtained. Note that an addition amount of γ-APS in the above reaction was 0.050 part by weight with respect to 100 parts by weight of polyamic acid. Further, as in the method in Example 1, a laminate of an alkali-free glass plate and a polyimide film that had a thickness of 22 μm could be obtained without spontaneous peeling. Table 1 and Table 2 show a change in viscosity in storage and properties of the polyimide film.

Example 4

Except that DMAc having a different water content was used, an alkoxysilane-modified polyamic acid solution was obtained as in Example 1. Thus obtained solution had a viscosity of 14200 mPa·s at 23° C. and a water content of 2500 ppm. Table 1 shows a change in viscosity in storage.

Example 5

A pressure was applied with dry nitrogen to an alkoxysilane-modified polyamic acid solution obtained as in Example 1 and thereby, the alkoxysilane-modified polyamic acid solution was filtrated by use of a capsule filter DFA HDC II (removal rating 1.2 μm) manufactured by Nihon Pall Ltd. After this filtration, unfiltrated residual solution had a viscosity of 12700 mPa·s at 23° C. and a water content of 2700 ppm. Table 1 shows a change in viscosity in storage.

Example 6

A pressure was applied with dry nitrogen to an alkoxysilane-modified polyamic acid solution obtained as in Example 1 and thereby, the alkoxysilane-modified polyamic acid solution was filtrated by use of a capsule filter DFA HDC II (removal rating 1.2 μm) manufactured by Nihon Pall Ltd. Thus filtrated solution had a viscosity of 12000 mPa·s at 23° C. and a water content of 3300 ppm. Table 1 shows a change in viscosity in storage.

Example 7

After an alkoxysilane-modified polyamic acid solution obtained as in Example 1 was left still for 60 minutes while kept open to the atmosphere, the solution was uniformly stirred. A resultant solution absorbed moisture and had a viscosity of 12100 mPa·s at 23° C. and a water content of 4400 ppm. Table 1 shows a change in viscosity in storage.

Example 8

To a solution obtained in Example 4, water of an amount equivalent to 0.3 weight % of the solution was added. A resultant solution had a viscosity of 13800 mPa·s at 23° C. and a water content of 4900 ppm. Table 1 shows a change in viscosity in storage.

Example 9

Into an experimental apparatus that was the same as that in Example 1, 850.0 g of dehydrated DMAc was introduced. Then, 40.34 g of PDA was added. Thereafter, a resultant solution was stirred for 30 minutes in a nitrogen atmosphere while being heated to 50.0° C. in an oil bath. After it was confirmed that ingredients were uniformly dissolved, 109.66 g of BPDA was added. Then, a temperature of the solution was adjusted to approximately 90° C., while the solution was being stirred for 10 minutes in a nitrogen atmosphere until ingredients were completely dissolved. Further, stirring was continued while the solution was heated at a constant temperature. Thereby, a viscosity was decreased and as a result, a viscous polyamic acid solution exhibiting a viscosity of 35500 mPa·s at 23° C. was obtained. Note that a concentration of an aromatic diamine and an aromatic tetracarboxylic dianhydride which were added in the above reaction solution was 15 weight % with respect to a whole reaction solution. Meanwhile, a molar ratio obtained by dividing the total number of moles of the aromatic tetracarboxylic dianhydride by the total number of moles of the aromatic diamine was 0.9991.

The above reaction solution was rapidly cooled in a water bath and a temperature of the solution was adjusted to approximately 50° C. Next, 7.5 g of a 1% DMAc solution of γ-APS was added and the solution was stirred. Reaction of the solution was ended after 2 hours, because change in viscosity stopped. Then, the solution was diluted with DMAc until the viscosity of the solution reached a viscosity that would allow easy handling of the solution. In this way, an alkoxysilane-modified polyamic acid solution exhibiting a viscosity of 13500 mPa·s at 23° C. and having a water content of 1500 ppm was obtained. Note that an addition amount of γ-APS in the above reaction was 0.050 part by weight with respect to 100 parts by weight of polyamic acid. Further, as in the method in Example 1, a laminate of an alkali-free glass plate and a polyimide film that had a thickness of 20 μm could be obtained. The polyimide film and the alkali-free glass plate had an appropriate peel strength, so that the polyimide film did not spontaneously peel off from the alkali-free glass plate in heating but could be stripped from the glass plate. Table 1 and Table 2 show a change in viscosity in storage and properties of the polyimide film.

Example 10

Into an experimental apparatus that was the same as that in Example 1, 850.0 g of dehydrated DMAc was introduced. Then, 40.61 g of PDA was added. Thereafter, a resultant solution was stirred for 30 minutes in a nitrogen atmosphere while being heated to 50.0° C. in an oil bath. After it was confirmed that ingredients were uniformly dissolved, 109.39 g of BPDA was added. Then, a temperature of the solution was adjusted to approximately 80° C., while the solution was being stirred for 10 minutes in a nitrogen atmosphere until ingredients were completely dissolved. Further, stirring was continued while the solution was heated at a constant temperature. Thereby, a viscosity was decreased and as a result, a viscous polyamic acid solution exhibiting a viscosity of 31200 mPa·s at 23° C. was obtained. Note that a concentration of an aromatic diamine and an aromatic tetracarboxylic dianhydride which were added in the above reaction solution was 15 weight % with respect to a whole reaction solution. Meanwhile, a molar ratio obtained by dividing the total number of moles of the aromatic tetracarboxylic dianhydride by the total number of moles of the aromatic diamine was 0.9901.

The above reaction solution was rapidly cooled in a water bath and a temperature of the solution was adjusted to approximately 50° C. Next, 7.5 g of a 1% DMAc solution of γ-APS was added and the solution was stirred. Reaction of the solution was ended after 3 hours, because change in viscosity stopped. Then, the solution was diluted with DMAc until the viscosity of the solution reached a viscosity that would allow easy handling of the solution. In this way, an alkoxysilane-modified polyamic acid solution exhibiting a viscosity of 13400 mPa·s at 23° C. and having a water content of 1800 ppm was obtained. Note that an addition amount of γ-APS in the above reaction was 0.050 part by weight with respect to 100 parts by weight of polyamic acid. Further, as in the method in Example 1, a laminate of an alkali-free glass plate and a polyimide film that had a thickness of 21 μm could be obtained. The polyimide film and the alkali-free glass plate had an appropriate peel strength, so that the polyimide film did not spontaneously peel off from the alkali-free glass plate in heating but could be stripped from the glass plate. Table 1 and Table 2 show a change in viscosity in storage and properties of the polyimide film.

Example 11

Into an experimental apparatus that was the same as that in Example 1, 850.0 g of dehydrated DMAc was introduced. Then, 40.91 g of PDA was added. Thereafter, a resultant solution was stirred for 30 minutes in a nitrogen atmosphere while being heated to 50.0° C. in an oil bath. After it was confirmed that ingredients were uniformly dissolved, 109.09 g of BPDA was added. Then, a temperature of the solution was adjusted to approximately 80° C., while the solution was being stirred for 10 minutes in a nitrogen atmosphere until ingredients were completely dissolved. Further, stirring was continued while the solution was heated at a constant temperature. Thereby, a viscosity was decreased and as a result, a viscous polyamic acid solution exhibiting a viscosity of 6300 mPa·s at 23° C. was obtained. Note that a concentration of an aromatic diamine and an aromatic tetracarboxylic dianhydride which were added in the above reaction solution was 15 weight % with respect to a whole reaction solution. Meanwhile, a molar ratio obtained by dividing the total number of moles of the aromatic tetracarboxylic dianhydride by the total number of moles of the aromatic diamine was 0.9801.

The above reaction solution was rapidly cooled in a water bath and a temperature of the solution was adjusted to approximately 50° C. Next, 7.5 g of a 1% DMAc solution of γ-APS was added and the solution was stirred. Reaction of the solution was ended after 2 hours, because change in viscosity stopped. In this way, an alkoxysilane-modified polyamic acid solution exhibiting a viscosity of 6100 mPa·s at 23° C. and having a water content of 2200 ppm was obtained. Note that an addition amount of γ-APS in the above reaction was 0.050 part by weight with respect to 100 parts by weight of polyamic acid. Further, as in the method in Example 1, a laminate of an alkali-free glass plate and a polyimide film that had a thickness of 20 μm could be obtained. The polyimide film and the alkali-free glass plate had an appropriate peel strength, so that the polyimide film did not spontaneously peel off from the alkali-free glass plate in heating but could be stripped from the glass plate. Table 1 and Table 2 show a change in viscosity in storage and properties of the polyimide film.

Comparative Example 1

After a polyamic acid solution was obtained as in Example 1, the polyamic acid solution was diluted with DMAc until a viscosity of the solution reached a viscosity that would allow easy handling of the solution. However, no γ-APS was added in Comparative Example 1. A resultant alkoxysilane-modified polyamic acid solution had a viscosity of 13600 mPa·s and a water content of 1100 ppm. This resultant solution was flow-casted on glass and imidized as in Example 1. However, in Comparative Example, 1, bubbles occurred between a polyimide film and the glass in thermal imidization. As a result, only a laminate of the polyimide film and the glass that had been partially peeled off from each other could be obtained. Table 2 shows properties of thus obtained polyimide film.

Comparative Example 2

Into a reaction container that was the same as that in Example 1, 850.0 g of dehydrated DMAc was introduced. Then, 110.08 g of BPDA was added and dispersed by stirring. Thereafter, while a resultant dispersion was heated to 50.0° C. in an oil bath, 40.17 g of PDA was gradually added over approximately 30 minutes. Then, stirring was continued for 1 hour until ingredients were completely dissolved and a viscosity became constant. Further, 250 g of DMAc was added and stirred, so that a viscous polyamic acid solution exhibiting a viscosity of 20100 mPa·s was obtained. Note that a concentration of an aromatic diamine and an aromatic tetracarboxylic dianhydride which were added in the above reaction solution was 15 weight % with respect to a whole reaction solution. Meanwhile, a molar ratio obtained by dividing the total number of moles of the aromatic tetracarboxylic dianhydride by the total number of moles of the aromatic diamine was 1.0070.

Further, the above reaction solution was rapidly cooled in a water bath and a temperature of the solution was adjusted to approximately 50° C. Next, 7.50 g of a 1% DMAc solution of γ-APS was added and the solution was stirred. Reaction of the solution was ended after 5 hours because change in viscosity stopped at 19100 mPa·s. Then, the solution was diluted with DMAc until the viscosity of the solution reached a viscosity that would allow easy handling of the solution. In this way, an alkoxysilane-modified polyamic acid solution exhibiting a viscosity of 13600 mPa·s at 23° C. and having a water content of 1400 ppm was obtained. Note that an addition amount of γ-APS in the above reaction was 0.050 part by weight with respect to 100 parts by weight of polyamic acid. Further, as in the method in Example 1, a laminate of glass and a polyimide film could be obtained without spontaneous peeling. Table 1 and Table 2 show a change in viscosity in storage and properties of the polyimide film.

Comparative Example 3

To a solution obtained in Comparative Example 2, water of an amount equivalent to 0.1 weight % of the solution was added. A resultant solution had a viscosity of 13300 mPa·s at 23° C. and a water content of 2600 ppm. Table 1 shows a change in viscosity in storage.

Comparative Example 4

To a solution obtained in Comparative Example 2, water of an amount equivalent to 0.3 weight % of the solution was added. A resultant solution had a viscosity of 13300 mPa·s at 23° C. and a water content of 4800 ppm. Table 1 shows a change in viscosity in storage.

Note that in Table 1, Examples and Comparative Examples are listed in the order of smaller to larger water contents. A rate of the change in viscosity is indicated in numerical values which are rounded off to the closest whole number.

TABLE 1

| | Total number of moles of aromatic tetracarboxylic dianhydride/ total number of moles of aromatic diamine | Silane Coupling Agent | Addition Amount (part by weight) | Water Content (ppm) | Initial Viscosity (mPa·s) | Storage Stability at 23° C. 55% RH | | Overall Evaluation |
|---|---|---|---|---|---|---|---|---|
| | | | | | | Viscosity after 1 week (mPa·s) | Rate of Change in Viscosity (%) | |
| Example 1 | 0.9975 | γ-APS | 0.05 | 1400 | 13700 | 12400 | −9 | B |
| Comparative Example 2 | 1.0070 | γ-APS | 0.05 | 1400 | 13600 | 11200 | −18 | — |
| Example 9 | 0.9991 | γ-APS | 0.05 | 1500 | 13500 | 12200 | −10 | C |
| Example 10 | 0.9901 | γ-APS | 0.05 | 1800 | 13400 | 12500 | −7 | A |
| Example 3 | 0.9950 | γ-APS | 0.05 | 1900 | 13800 | 12700 | −8 | B |
| Example 11 | 0.9801 | γ-APS | 0.05 | 2200 | 6100 | 5700 | −7 | A |
| Example 4 | 0.9975 | γ-APS | 0.05 | 2500 | 14200 | 12500 | −12 | C |
| Comparative Example 3 | 1.0070 | γ-APS | 0.05 | 2600 | 13300 | 10200 | −23 | — |
| Example 5 | 0.9975 | γ-APS | 0.05 | 2700 | 12700 | 10400 | −18 | E |
| Example 2 | 0.9975 | γ-APS | 0.01 | 2800 | 13100 | 11600 | −11 | B |
| Example 6 | 0.9975 | γ-APS | 0.05 | 3300 | 12000 | 10000 | −17 | E |
| Example 7 | 0.9975 | γ-APS | 0.05 | 4400 | 12100 | 9900 | −18 | C |
| Comparative Example 4 | 1.0070 | γ-APS | 0.05 | 4800 | 13300 | 8600 | −35 | — |
| Example 8 | 0.9975 | γ-APS | 0.05 | 4900 | 13800 | 10600 | −23 | D |

Table 2 shows results of evaluation of adhesion of a polyimide film obtained from each solution, with respect to glass, and a linear expansion coefficient of the polyimide film. The adhesion was evaluated as excellent in a case where no gap occurred between the polyimide film and the glass in visual inspection and the polyimide film had a uniform appearance; meanwhile, the adhesion was evaluated as poor in a case where a gap occurred between the polyimide film and the glass or bubbles or the like occurred in the polyimide film.

TABLE 2

| | Total number of moles of aromatic tetracarboxylic dianhydride/ total number of moles of aromatic diamine | Silane Coupling Agent | Addition Amount (part by weight) | Thickness (μm) | Adhesion | Linear Expansion Coefficient (ppm/° C.) |
|---|---|---|---|---|---|---|
| Example 1 | 0.9975 | γ-APS | 0.05 | 19 | excellent | 8 |
| Example 2 | 0.9975 | γ-APS | 0.01 | 20 | excellent | 8 |
| Example 3 | 0.9950 | γ-APS | 0.05 | 22 | excellent | 7 |
| Example 9 | 0.9991 | γ-APS | 0.05 | 20 | excellent | 6 |
| Example 10 | 0.9901 | γ-APS | 0.05 | 21 | excellent | 8 |
| Example 11 | 0.9801 | γ-APS | 0.05 | 20 | excellent | 8 |
| Comparative Example 1 | 0.9975 | none | — | 18 | poor | 7 |
| Comparative Example 2 | 1.0070 | γ-APS | 0.05 | 21 | excellent | 8 |

A larger water content of a solution results in a lower storage stability of the solution and a lower viscosity of the solution. However, in a case where solutions have an identical water content, a change in viscosity can be reduced by the method of the present invention. In Examples 1 through 11, a larger water content tends to result in a larger decrease in viscosity. Similarly, in Comparative Examples 2 through 4, a larger water content results in a larger decrease in viscosity. In particular, the change in viscosity is smaller in Examples 1, 3, and 10 as compared to that in Example 9. Though Examples 1, 3, 9, and 10 each have a water content similar to that of Comparative Example 2, the rate of the change in viscosity is smaller in Examples 1, 3, 9, and 10. Similarly, though Examples 2, 4, 5, 6, and 11 each have a water content similar to that of Comparative Example 3, the rate of the change in viscosity is smaller in Examples 2, 4, 5, 6, and 11. Furthermore, similarly, though Examples 7 and 8 each have a water content similar to that of Comparative Example 4, the rate of the change in viscosity is smaller in Examples 7 and 8. For example, Examples 5 and 6 each have a water content of approximately 3000 ppm whereas Comparative Example 2 has a water content of 1400 ppm, and accordingly, the water content in Examples 5 and 6 is approximately twice as large as that of Comparative Example 2. However, the rate of change in viscosity is substantially the same between Examples 5 and 6 and Comparative Example 2.

Furthermore, the above results each were evaluated with grades of A to E and this evaluation results are shown in a column of overall evaluation in Table 1. The following is criteria of this evaluation.

A: a value obtained by dividing a rate of change in viscosity by a rate of change in viscosity of Comparative Example having a similar water content is 0.4 or less;

B: a value obtained by dividing a rate of change in viscosity by a rate of change in viscosity of Comparative Example having a similar water content is more than 0.4 and 0.5 or less;

C: a value obtained by dividing a rate of change in viscosity by a rate of change in viscosity of Comparative Example having a similar water content is more than 0.5 and 0.6 or less;

D: a value obtained by dividing a rate of change in viscosity by a rate of change in viscosity of Comparative Example having a similar water content is more than 0.6 and 0.7 or less; and E: a value obtained by dividing a rate of change in viscosity by a rate of change in viscosity of Comparative Example having a similar water content is greater than 0.7.

Note that "Comparative Example having a similar water content" of any of Examples (referred to as Example α) indicates one of Comparative Examples 2 to 4, which one Comparative Example has a water content whose absolute value of a difference from that of Example α is the smallest. For example, in the case of Example 6, an absolute value of a difference in water content from Comparative Example 2 is 1900; an absolute value of a difference in water content from Comparative Example 3 is 700; and an absolute value of a difference in water content from Comparative Example 4 is 1500. Accordingly, Example 6 is evaluated in comparison with Comparative Example 3.

Specifically, in the overall evaluation, Examples 1, 3, 9 and 10 were compared with Comparative Example 2 having a similar water content. Meanwhile, Examples 2, 4 through 6 and 11 were compared with Comparative Example 3 having a similar water content. On the other hand, Examples 7 and 8 were compared with Comparative Example 4 having a similar water content.

The following discusses results of overall evaluations. In a case where the molar ratio obtained by dividing the total number of moles of the aromatic tetracarboxylic dianhydride by the total number of moles of the aromatic diamine (hereinafter, also referred to simply as "molar ratio") is 0.9950 or less (Examples 3, 10 and 11), the overall evaluations is A or B. In particular, in a case where the molar ratio is 0.9901 or less (Examples 10 and 11), the overall evaluation is A.

Meanwhile, in a case where the molar ratio is 0.9975 or less and the water content is 2500 or less (Examples 1, 3, 4, 10 and 11), the overall evaluation is A, B or C. In a case where the molar ratio is 0.9975 or less and the water content is 2200 or less (Examples 1, 3, 10 and 11), the overall evaluation is A or B.

Further, in the polyimide films of Examples 1 through 3, and 9 through 11, no bubble occurred between the polyimide film and the glass even when the polyimide film had a dry thickness of approximately 20 μm, so that a laminate of the polyimide film and the glass could be obtained. On the other hand, in the polyimide film of Comparative Example 1, bubbles occurred between the polyimide film and the glass even when the polyimide film had a dry thickness of approximately 20 μm, so that a laminate of the polyimide film and the glass could not be obtained.

Furthermore, the polyimide films of Example 1 through 3, and 9 through 11 and Comparative Example 2 neither curled nor warped after peeled off from the alkali-free glass. This is because these polyimide films each has a linear expansion coefficient of 6 ppm/° C. to 8 ppm/° C. which is close to a linear expansion coefficient of the alkali-free glass.

INDUSTRIAL APPLICABILITY

As described above, the present invention makes it possible to provide (A) a polyamic acid solution which can be (i) used to form a film that does not peel off even in a case where the film has a large thickness, and (ii) stably stored at a room temperature, and (B) a laminate of a polyimide film and an inorganic substrate which laminate can be suitably used for production of a flexible device.

Therefore, the present invention can be suitably used, for example, in the field of electronic devices such as flat panel displays and electronic papers.

The invention claimed is:

1. An alkoxysilane-modified polyamic acid solution obtained by reacting, in a solution, (a) an alkoxysilane compound containing an amino group and (b) a polyamic acid having been obtained by reacting, in a solvent, an aromatic diamine and an aromatic tetracarboxylic dianhydride,
the alkoxysilane-modified polyamic acid solution having a molar ratio of 0.980 or more and 0.9995 or less, the molar ratio being obtained by dividing a total number of moles of the aromatic tetracarboxylic dianhydride by a total number of moles of the aromatic diamine,
wherein in a case where an amount of the polyamic acid in the alkoxysilane-modified polyamic acid solution is 100 parts by weight, an amount of the alkoxysilane compound added is 0.01 part by weight to 0.50 part by weight, and
wherein a viscosity of the alkoxysilane-modified polyamic acid solution at 23° C. measured according to JIS K7117-2:1999 is 5700 to 14200 mPa·s.

2. The alkoxysilane-modified polyamic acid solution as set forth in claim 1, wherein:
the aromatic tetracarboxylic dianhydride is 3,3',4,4'-biphenyltetracarboxylic dianhydride; and
the aromatic diamine is represented by the following formula (1):

[Chem. 1]

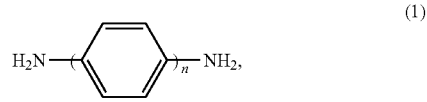

(1)

where n is an integer of 1 to 3.

3. The alkoxysilane-modified polyamic acid solution as set forth in claim 1, wherein a main component of the solvent is an amide solvent.

4. A flexible device comprising:
a polyimide film obtained from the alkoxysilane-modified polyamic acid solution as set forth in claim 1; and
an electronic element formed on the polyimide film.

5. A laminate comprising:
a polyimide film obtained from the alkoxysilane-modified polyamic acid solution as set forth in claim 1; and
an inorganic substrate on which the polyimide film is laminated,
the polyimide film having a linear expansion coefficient of 1 ppm/° C. to 10 ppm/° C.

6. The laminate as set forth in claim 5, wherein:
the inorganic substrate has a thickness of 0.4 mm to 5.0 mm; and
the polyimide film has a thickness of 10 μm to 50 μm.

7. A method of producing a laminate, the method comprising the steps of:
flow-casting the alkoxysilane-modified polyamic acid solution as set forth in claim 1, on an inorganic substrate; and
obtaining, by thermal imidization of the alkoxysilane-modified polyamic acid solution, the laminate in which a polyimide film obtained from the alkoxysilane-modified polyamic acid solution is laminated on the inorganic substrate.

8. A method of producing a flexible device, the method comprising the steps of:
forming an electronic element on a polyimide film of a laminate obtained by the method as set forth in claim 7; and
peeling, from the inorganic substrate, the polyimide film on which the electronic element has been formed.

9. An alkoxysilane-modified polyamic acid solution obtained by reacting, in a solution, (a) an alkoxysilane compound containing an amino group and (b) a polyamic acid having been obtained by reacting, in a solvent, an aromatic diamine and an aromatic tetracarboxylic dianhydride,
the alkoxysilane-modified polyamic acid solution having a molar ratio of 0.980 or more and 0.9995 or less, the molar ratio being obtained by dividing a total number of moles of the aromatic tetracarboxylic dianhydride by a total number of moles of the aromatic diamine, and, having a water content of 500 ppm or more and 3000 ppm or less,
wherein in a case where an amount of the polyamic acid in the alkoxysilane-modified polyamic acid solution is 100 parts by weight, an amount of the alkoxysilane compound added is 0.01 part by weight to 0.50 part by weight, and
wherein a viscosity of the alkoxysilane-modified polyamic acid solution at 23° C. measured according to JIS K7117-2:1999 is 5700 to 14200 mPa·s.

10. A method of producing an alkoxysilane-modified polyamic acid solution, the method comprising the steps of:
obtaining a polyamic acid by reacting, in a solvent, the aromatic diamine and the aromatic tetracarboxylic dianhydride; and
obtaining the alkoxysilane-modified polyamic acid solution by reacting, in a solution, (a) an alkoxysilane compound containing an amino group and (b) the polyamic acid, the alkoxysilane-modified polyamic acid solution having a molar ratio of 0.980 or more and 0.9995 or less, the molar ratio being obtained by dividing a total number of moles of an aromatic tetracarboxylic dianhydride by a total number of moles of an aromatic diamine,
wherein in a case where an amount of the polyamic acid in the alkoxysilane-modified polyamic acid solution is 100 parts by weight, an amount of the alkoxysilane compound added is 0.01 part by weight to 0.50 part by weight, and
wherein a viscosity of the alkoxysilane-modified polyamic acid solution at 23° C. measured according to JIS K7117-2:1999 is 5700 to 14200 mPa·s.

11. A method of producing an alkoxysilane-modified polyamic acid solution, the method comprising the steps of:
obtaining a polyamic acid by reacting, in a solvent, the aromatic diamine and the aromatic tetracarboxylic dianhydride; and
obtaining the alkoxysilane-modified polyamic acid solution by reacting, in a solution, (a) an alkoxysilane compound containing an amino group and (b) the polyamic acid, the alkoxysilane-modified polyamic acid solution having a molar ratio of 0.980 or more and 0.9995 or less, the molar ratio being obtained by dividing a total number of moles of an aromatic tetracarboxylic dianhydride by a total number of moles of an aromatic diamine, and having a water content of 500 ppm or more and 3000 ppm or less,
wherein in a case where an amount of the polyamic acid in the alkoxysilane-modified polyamic acid solution is 100 parts by weight, an amount of the alkoxysilane compound added is 0.01 part by weight to 0.50 part by weight, and
wherein a viscosity of the alkoxysilane-modified polyamic acid solution at 23° C. measured according to JIS K7117-2:1999 is 5700 to 14200 mPa·s.

\* \* \* \* \*